United States Patent

[11] 3,579,186

[72] Inventors Robert R. Johnson
Franklin;
Richard L. Dunham, Bloomfield Hills, Mich.

[21] Appl. No. 739,803
[22] Filed June 25, 1968
[45] Patented May 18, 1971
[73] Assignee Burroughs Corporation
Detroit, Mich.

[54] PERSONAL IDENTIFICATION METHOD AND APPARATUS
18 Claims, 8 Drawing Figs.

[52] U.S. Cl. .... 340/146.3, 179/2, 340/149, 235/61.7
[51] Int. Cl. .... G06k 5/00
[50] Field of Search .... 340/146.3, 149, 149 (A); 179/1 (ASM); 73/432; 179/2 (DP,CA); 235/61.7 (B), 61.7 (live)

[56] References Cited
UNITED STATES PATENTS
3,113,461 12/1963 Peters .... 340/146.3
3,133,266 5/1964 Frishkoff .... 340/146.3
3,480,911 11/1969 Danna .... 340/146.3

*Primary Examiner*—Thomas A. Robinson
*Attorneys*—Kenneth L. Miller and Wallace P. Lamb

ABSTRACT: A method and apparatus for positively determining whether an individual is a member of a predetermined group based on unique repeatable characteristics of an electrical waveform generated by a force-responsive transducer whenever the person writes his name or other mark. In accordance with the preferred embodiment of the invention disclosed herein, positive identification of a person as being an authorized member of a predetermined group is made by an apparatus which compares prerecorded authorized signature characterizing information with an electrical waveform generated when the person signs his signature. The comparison may for example comprise a cross or autocorrelation technique in which the identifying apparatus determines whether the waveform generated by the person in signing his signature correlates within a predetermined degree with the previously recorded signature identifying information.

INVENTORS.
ROBERT ROYCE JOHNSON.
RICHARD LEE DUNHAM.
BY Paul W Fish
ATTORNEY.

PERSONAL IDENTIFICATION METHOD AND APPARATUS

CROSS-REFERENCE

The pen disclosed and claimed in copending application Ser. No. 739817, filed June 25, 1968 in the names of R. R. Johnson et al. entitled Stylus with Pressure Responsive Transducer, now U.S. Pat. No. 3,528,295, and of common ownership herewith, is useful in the method and apparatus disclosed herein, and is incorporated by reference herein.

BRIEF STATEMENT OF THE INVENTION

This invention relates to a personal identification system and more particularly to a method and apparatus for positively establishing the identity of a person as a member of a predetermined group by comparing an electrical waveform generated whenever the individual writes his signature with previously generated authorized signature identifying data.

BACKGROUND

As is known in the business and commercial world it is often desirable to positively identify an individual. Positive identification is useful in preventing the perpetration of fraud in commercial transactions and to properly identify those individuals who are cleared to enter a restricted area in security environments. In the past, badges, ID cards, tokens and the like have been employed to identify individuals and a clerk or guard has been used to determine whether the individual presenting the card is the person to whom such card or pass was issued. Security schemes relying upon ID cards have not been totally satisfactory as they depend on the ability of the guard to detect that the person presenting the ID card is not the individual to whom such pass or token was properly issued. This system, while widely employed has not been totally satisfactory because an individual can easily gain unauthorized access.

In the commercial world one area in which positive identification of an individual is becoming increasingly more necessary is in the so-called credit card field. In one commercial credit system, a prospective user is issued a so-called credit card which indicates that the holder is authorized to receive credit when he presents the card to any of a group of participating vendors, suppliers or other prospective creditors. In such a credit system, problems are often encountered when the identity or general type credit card is lost or stolen and is later presented by an unauthorized holder in whose possession it may happen to have fallen.

The problems encountered in security applications and commercial credit situations are somewhat similar in that they require the positive identification of an individual at a particular time. In the past both the security and the credit card applications have primarily relied upon the visual inspection of a card or token by a guard or clerk to determine if the person presenting the card is the rightful user or holder of the identification device. As is known, the failure of the guard or teller to detect the fraudulent presentation of a card can have serious consequences. For example, an unauthorized person may gain access to a security area thereby jeopardizing the security of a particular project. Likewise, in the commercial environment, the undetected use of a credit card may result in the extending of credit to an unauthorized user and the attendant uncollectable debt. Indeed this problem of use of credit cards by individuals to whom such cards are not rightfully issued, has resulted in significant losses in the commercial world.

It is therefore an object of the present invention to reliably establish the identification of an individual thereby preventing fraud or deception in commercial and security applications.

It is a further object of the present invention to provide an improved method and apparatus for positively identifying an individual as being a member of a predetermined group on the basis of his written signature.

It is yet another object of the present invention to mechanize the determination of the identity of predetermined groups of individuals.

It is yet another object of the present invention to provide improved apparatus for positively identifying a person as an individual member of a predetermined class or group on the basis of his signature.

It is a still further object of the present invention to significantly reduce the possibility for one to fraudulently present an identification card in security and commercial transactions.

The above objects and other desirable aspects are achieved in accordance with the preferred embodiment of the invention by generating an electrical waveform whenever an individual presenting a credit card writes his signature or other identifying mark. This electrical waveform generated by the individual in writing his signature or mark is then compared with previously generated authorized signature identifying data.

In the preferred embodiment of the invention, a force or pressure-responsive transducer is employed to generate a signature characterizing analogue electrical waveform. The instantaneous amplitude of the analogue waveform is proportional to the time varying forces exerted between the writing surface and the tip of a writing stylus. Various characteristics or parameters of this signature identifying analogue waveform may then be classified and recorded, for example, as a binary number on a credit card. Whenever the individual to whom the card is issued, or an unauthorized user attempts to use the card, the previously recorded signature characterizing information is read from the card and compared against similar signature characterizing parameters of an electrical waveform generated whenever the individual presenting the card signs his signature. The preferred method for comparing such previously recorded data and the signature identifying waveform at the time the card is presented is to convert the stored binary information into an analogue signal and then to cross correlate the stored information waveform with the dynamic signature generated waveform. In such a system, the signature waveform of the person presenting the card would be required to correlate within a predetermined factor with the stored information waveform before a "true" signature verification would be given.

For a more complete understanding of the invention and its preferred structure and mode of operation reference may be had to the following detailed description in conjunction with the drawings wherein:

FIGS. 2A and 2B illustrate a typical signature and its associated force-time analogue electrical waveform respectively.

Before referring to the specific embodiments of the invention shown in the various FIGS., the method for positively establishing identification of an individual as a member of a predetermined group in accordance with this invention will first be explained. In accordance with this method for establishing the identity of an individual, a force or pressure waveform is generated whenever the individual signs his signature or makes his identifying mark. To enroll the individual as an authorized member in a personal identification group, this analogue electrical waveform, which corresponds to the varying force or pressure waveform generated whenever the stylus used in making the mark or signature contacts the paper, is analyzed for unique characteristics or recorded for subsequent analysis.

The unique, signature characterizing information obtained from analyzing predetermined parameters or characteristics of the analogue waveform are then recorded and stored, for example as binary information bits on a credit card or token. Whenever the individual wishes to establish his identity in, for example, a commercial credit transaction, he presents a card and writes his usual signature or identifying mark. Identifying features of the electrical waveform generated at this time are then compared against the previously recorded signature identifying data. If the force analogue electrical waveform generated at the time the person writes his signature favorably correlates within a predetermined factor with the previously recorded authorized signature identification data, then the signature is determined to be that of the person to whom the credit card or badge was issued and the person's identity has been established.

Figures 1, 2, 3:
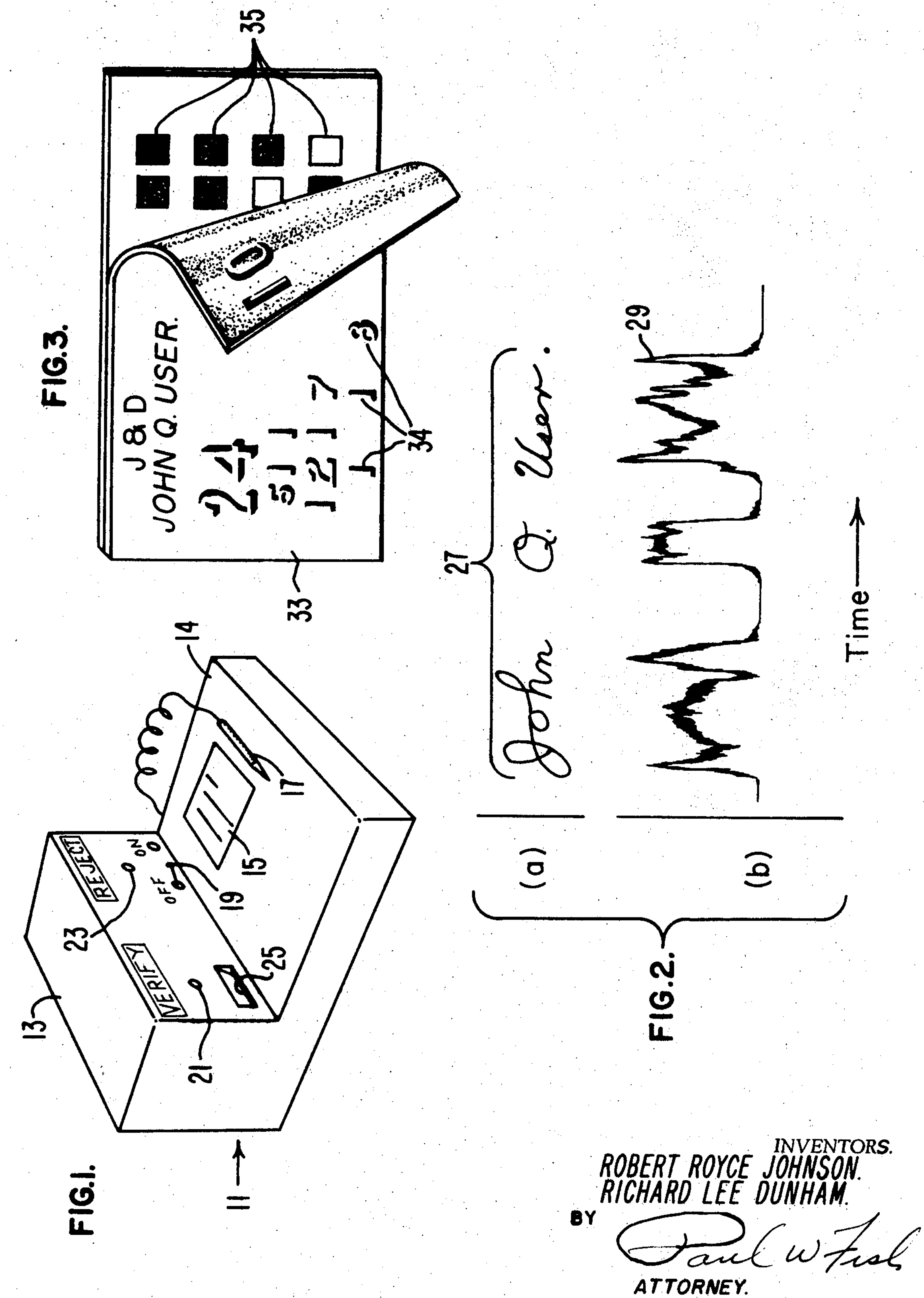
FIG. 1 is a perspective view of a signature verifier embodying the principles of the present invention.
FIG. 3 is a partially broken-away top view of a credit card utilizable in accordance with one of the principles of the present invention.

Referring now to FIG. 1, there is shown a perspective view of a signature verifier 11 incorporating the principles of the present invention. As shown, the signature verifier 11 includes a housing 13 for supporting and enclosing the operative components of the signature verifying device within a closed chamber. At one extremity of housing 13 is located a table portion 14 having mounted therein a suitable tablet or marking area 15. A pen or marking stylus 17 is operably p0sitioned with tablet 15.

The control panel includes an appropriate OFF-ON switch 19 for controlling the application of an energizing source of electrical potential. A plurality of indicator lamps are provided to indicate to the operator the various functional stages of the apparatus including a signature verify check lamp 21 and a signature reject lamp 23. A slot 25 is adapted to receive an identifying token or card such as a credit card 33 illustrated in FIG. 3.

In operation a prospective customer or authorized entrant into a security area would present his card by inserting it into a slot or aperture 25. As is hereinafter to be more fully explained, the previously encoded personal identifying marks 35 (FIG. 3) which may comprise optically or magnetically encoded areas within card 33, actuates card reader circuitry to enter authorized signature identifying data into the verifier 11. This data may as hereinafter is explained be used to generate a waveform characterizing the authorized signature of the person to whom the card has been issued. At the time the card is presented and inserted into slot 25 to verify the identity of the person presenting the card, the presenter employs stylus 17 to write his signature for example on the tablet 15 of signature verifier 11.

As illustrated in FIGS. 2(*a*) and 2(*b*), a typical signature 27 has associated with it a varying amplitude electrical analogue signal 29. This electrical signal 29 may be generated whenever the card submitter writes his signature as illustrated in FIG. 2A on the tablet 15. This varying amplitude electrical analogue waveform 27 may be generated by the stylus 17 or a pressure responsive table 15. Preferably the stylus is of the type disclosed and claimed in the hereinabove identified copending patent application in the names of Johnson et al. Briefly the stylus 17 or pen disclosed in the above identified application comprises a ballpoint-type pen in which a force or pressure-responsive transducer is actuated by the inward travel of a cartridge member due to the varying force with which a tip on the writing stylus contacts the writing surface. As is hereinafter to be more fully explained, the electrical analogue waveform 29 which is generated, whenever the presenter of a credit or ID-type card writes his signature, is compared against authorized signature characterizing data, for example, the signature-identifying marks 35 recorded on card 33. If the comparison is favorable, i.e., within predetermined limits, the appropriate signature verifying lamp 21 (FIG. 1) would be energized thereby signalling that the individual presenting the card is the authorized user or holder of the card. In the event the signature failed to compare within predetermined limits, the reject lamp 23 (FIG. 1) would be energized indicating that the person presenting the card is either not the authorized user or has not signed the authorized signature.

Figure 4:
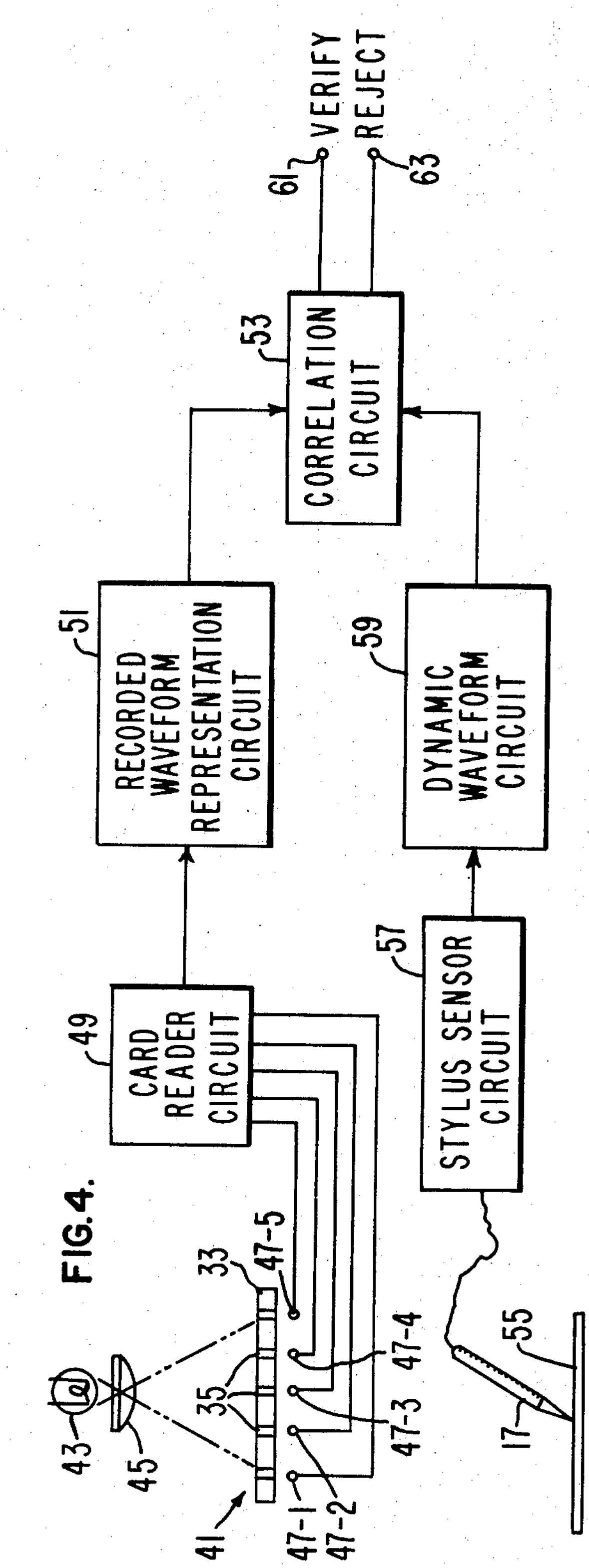
FIG. 4 is an electrical block diagram of a signature verifier circuit utilizable in accordance with one aspect of the principles of the present invention.

Referring now to FIG. 4 there is shown a block diagram of an electrical circuit utilizable in practicing one embodiment of the invention. As hereinabove stated, the identity of an individual is positively established in accordance with the invention by comparing previously recorded data which characterizes an authorized signature with an electrical waveform generated at the time the identification is to be made. As shown, the recorded authorized signature characterizing information, for example, that shown recorded in binary coded form on card 33 in FIG. 3, is read whenever the card is positioned at a card reading station 41. Light rays from a scanning lamp 43 are focused by lens 45 onto the information field of card 33. In the embodiment in which the binarily encoded information on card 33 comprises optically transparent and optically opaque areas for a binary 1 and a binary 0 respectively, the illumination from lamp 43 reaching individual photocells 47–1 to 47–5 depends upon the coded information 35 proximate each respective photocell 47. As is well known in the art, the conductivity of the respective photocells 47 is proportional to the level of incident radiation. Thus the card reader station 41 converts the recorded information into electrical signals in accordance with various levels of conductivity or nonconductivity of the photocells 47 in response to the pattern of radiation passed through the respective information apertures or portions of card 33. The information signals generated by the card reader 41 are coupled to the input of a recorded waveform representation circuit 51, which may comprise for example an array of binary elements, as flip flops, in a counter or shift register configuration. In this manner a positionally coded binary number corresponding to predetermined signature characterizing data may be read from the card 33 and stored for subsequent comparison purposes. The output of the recorded waveform circuit 51 is coupled to the input of a comparator or matching network 53. As hereinafter to be more fully explained, the matching network may comprise an array of AND gates for comparing the contents of circuit 51 with similar contents of circuit 59.

The second input to the signature verifying circuit is generated whenever a signature or mark is written by stylus 17 on record sheet 55. The stylus sensor circuit 57 may comprise any appropriate bridge type circuit for utilizing the output from a strain gauge (not herein shown) which as set forth in the hereinabove cross-referenced copending application may be positioned in the stylus. The output of the stylus sensor circuit 57 is coupled to the input of dynamic waveform circuit 59. The output from the stylus sensor circuit 57 preferably comprises an analogue waveform similar to that shown in FIG. 2B. Depending upon the degree of security required for a particular ID application, the dynamic waveform circuit 59 may detect various time varying features or parameters of the analogue waveform and generate for example a binary representation of its characterizing value. One example of a utilizable dynamic waveform circuit 59 comprises a Schmitt trigger circuit which generates a particular binary level for every zero or predetermined reference crossing of the analogue waveform. In this manner, by sampling the output of the Schmitt trigger at predetermined times, a binary coded sequence may be generated which corresponds to the varying instantaneous amplitude of the analogue waveform. In this example the binarily encoded waveform from the dynamic circuit 59 may be stored in a counter or register to be compared with the recorded data in the comparator 53. For example comparator 53 may comprise an array of AND gates with corresponding ones of the stages of the counter or shift registers of circuits 51 and 59 being coupled to the inputs of the respective AND gates. If the correlation of the respective recorded waveform and dynamic waveform circuits is within a predetermined degree for example within a predetermined count difference, the verify terminal 61 of correlation circuit 53 is energized thereby signalling the true match condition. On the other hand, if the recorded waveform and the dynamically generated waveform do not correlate within predetermined limits, i.e. differ by more than a predetermined count, the comparator circuit 53 energizes the reject output terminal 63 thereby indicating that the two waveforms have not matched within the predetermined requirements.

Figures 5, 7:
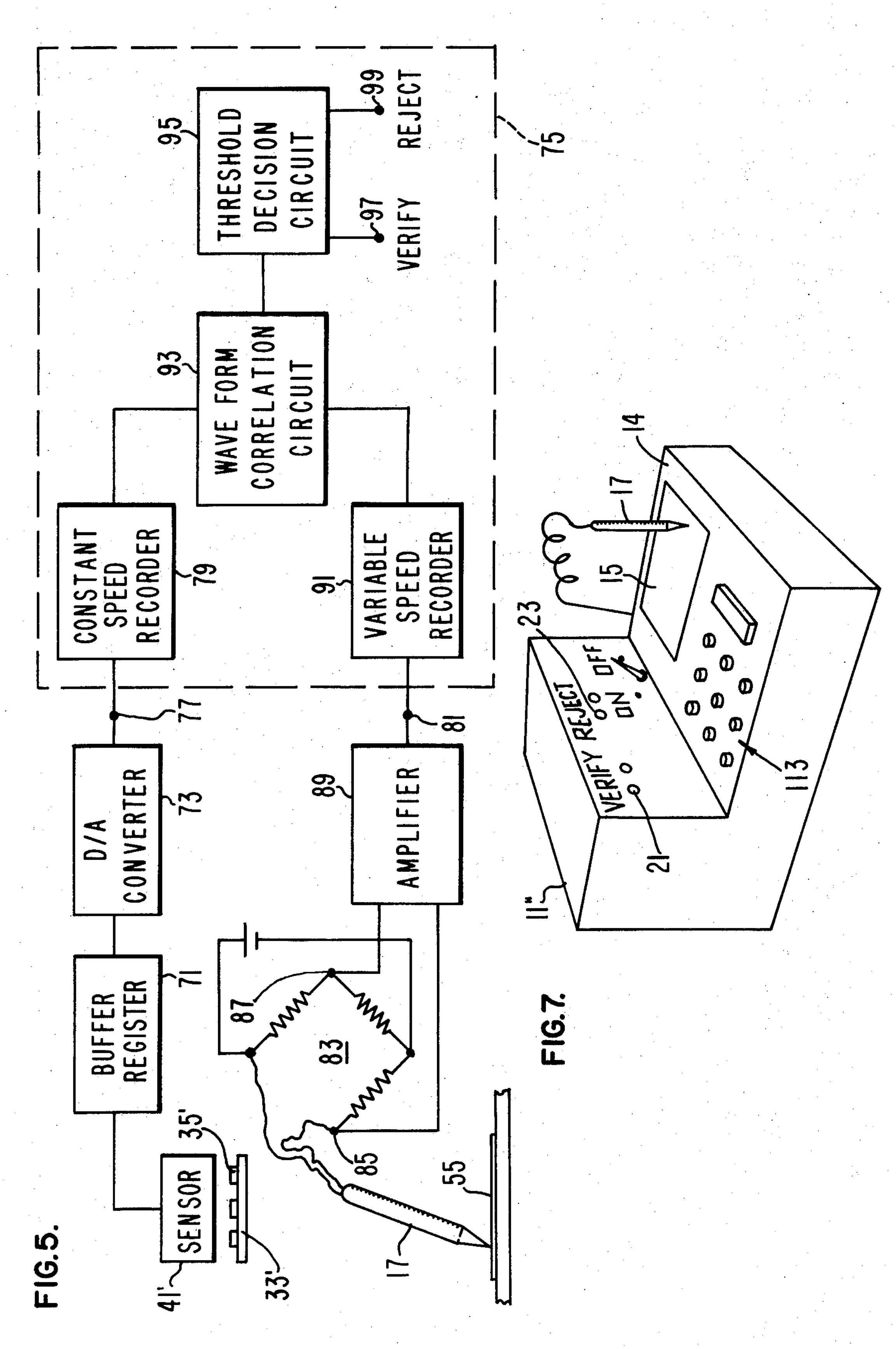
FIG. 5 is a block diagram of an electrical circuit utilizable in establishing the positive identification of an individual in accordance with the principles of the present invention.
FIG. 7 is a perspective view of another embodiment of a signature verifier in accordance with other aspects of the principles of the present invention.

Referring now to FIG. 5 there is shown the preferred embodiment of an electrical circuit utilizable in practicing the principles of the present invention. As hereinabove explained, the electrical circuit comprises a dual input channel for developing electrical signals proportional to the prerecorded authorized signature characterizing data and to the dynamic signature waveform. A recorded information sensor circuit 41' is arranged to read information recorded on the token or card 33' for example, by magnetic or optical sensing. A buffer register circuit 71 which may comprise a flip flop shift register or counter is arranged to store the output of the sensor circuit 41' in binary coded form. The output of register 71 is coupled to the input of a digital-to-analogue converter 73. The D/A converter circuit 73 generates an analogue electrical signal corresponding to the signature characterizing data read from card 33' and stored in register 71. The output of the digital-to-analogue converter is coupled to input terminal 77 of generalized correlation circuit 75. Input terminal 77 of the correlation network 75 is coupled to a write head of a constant speed recorder 79, for example, a magnetic tape recorder.

The second input which is coupled to terminal 81 of the correlation network 75 is generated by the stylus 17. As hereinabove explained, the stylus 17 may comprise a force-responsive transducer mounted within a conventional type ball point pen. The pressure-responsive transducer (not shown) may comprise a strain gauge connected as one leg of electrical bridge circuit 83. As the marking tip of the stylus 17 moves in contact with a writing surface 55 a varying force or pressure is exerted on the strain gauge transducer thereby causing an electrical imbalance of the bridge. This electrical imbalance generates an output signal across output terminals 85 and 87 of the bridge circuit 83. The output of the bridge 83 is coupled to the input of a linear amplifier circuit 89 which is arranged to boost the signal amplitude to an appropriate signal level. The output of amplifier 89 is coupled to the input terminal 81 of the correlation network 75. Input terminal 81 of the autocorrection network is coupled to a write head (not shown) of a variable speed recorder 91. Variable speed recorder 91 may comprise a magnetic disc or tape recorder which is adapted to make sequential runs at various predetermined, graduated speeds.

With the prerecorded signature characterizing data waveform recorded as an analogue signal in the constant speed recorder 79 and the dynamically generated signature characterizing analogue waveform recorded in the variable speed recorder 91, the two waveforms are compared one against the other as the variable speed recorder 91 makes successive passes at various predetermined speeds. The correlation or matching circuit 93 checks the level of correlation of the waveforms as the variable speed recorder makes successive passes at, for example, increasingly greater speeds. The output from the correlation circuit 93 is coupled to the input of a threshold decision circuit 95. Depending upon the degree of comparison or match between the previously recorded signature characterizing waveform stored in the constant speed recorder 79 and the dynamically generated signature waveform stored in the variable speed recorder 91, the decision circuit 95 either signals a verify or reject condition by actuating terminal 97 or 99 respectively.

The threshold circuit 95 for example, may be set at a 90 percent value and then if as the variable speed recorder makes one of its several passes the dynamically generated signature characterizing waveform correlates or matches within 90 percent with the previously recorded signature characterizing waveform the threshold circuit 95 could energize verify terminal 97 indicating a true or verify condition. On the other hand, if the waveforms do not correlate within the predetermined percentage as variable speed recorder plays back at successive speed steps, the decision circuit 95 at the end of a predetermined time would indicate a no comparison or reject condition by energizing the reject terminal 99. The reject condition would indicate that the authorized signature had not been signed by the person to be identified and depending upon the security requirements a particular signature verifier may limit the number of times an individual may attempt to rewrite the authorized signature before a firm of final rejection is signalled. The respective verify and reject output terminals 97 and 99 may be employed to energize any appropriate indicator, for example, lamps 21 and 23 as shown in FIG. 1.

One typical embodiment of a correlation circuit has been explained in conjunction with the signature verifier illustrated in FIG. 5. It is to be understood that the signals from the D/A converter 73, representing the authorized signature, and from the amplifier 89 representing the dynamic signature could be coupled to the respective inputs of any correlation equipment which is presently commercially available. As is known to those skilled in the art, the cross correlation function may be implemented or instrumented in various ways.

In general, signal correlation in the communication field is concerned with determining the relationship between two signals which arise in a common process. The cross correlation function, which is expressed mathematically as the correlation integral, can be described generally as representing the degree of conformity between two signals as a function of their mutual delay. For a complete understanding of the correlation function reference may be had to one of many standard texts, for example chapter 10 entitled Measurement of Correlation and Probability in Y. W. Lee's STATISTICAL THEORY OF COMMUNICATION, JOHN WYLIE AND SONS INC., 1960. Further, for an understanding of the structure and operation of various electronic correlation circuits reference may be had to one of the following articles: (1) A DIGITAL ELECTRONIC CORRELATOR, H. E. SINGLETON PROC. IRE V38, No. 12, Dec., 1950; (2) AN ANALOGUE ELECTRONIC CORRELATOR, J. F. REINTJES PROC. NEC 7, pp. 390—400, 1951; (3) CORRELATION ENTERING NEW FIELDS WITH REAL-TIME SIGNAL ANALYSIS, B. LUBON ELECTRONICS, V39 No. 22, pp. 25—81.

Figure 6:
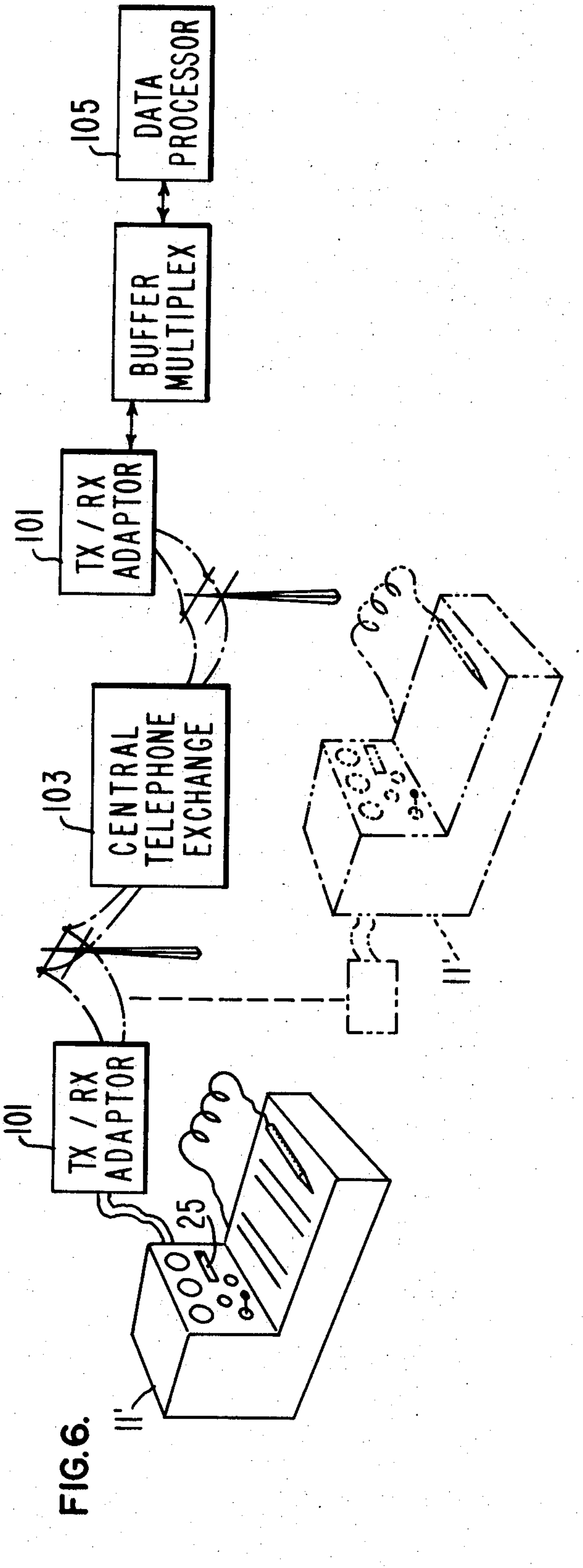
FIG. 6 is a block diagram of an ID system incorporating the signature verification aspects of the principles of the present invention.

Referring now to FIG. 6 another embodiment of applicants' signature verifier will now be explained. In FIG. 6 an online system is shown in which the signature verifier 11' is coupled via a transmission adapter 101 which may comprise, for example, a frequency shift keyed mode for coupling the verifier to the central telephone exchange 103 and thence to an online data processor station 105. In this embodiment appropriate account information, for example, the embossed account data 34 and the coded signature information 35 on card 33 may be read from the credit card when it is inserted into slot 25 of the signature verifier 11. This account information may be transmitted via the telephone exchange 103 to the data processor 105 for a determination of the credit rating of the individual card holder. Likewise, the signature characterizing electrical analogue waveform may be transmitted via the communication link to the data processor 105 and the appropriate correlation between previously recorded signature waveform and dynamically generated signature waveform may be made by the data processor 105. Alternatively, the correlation between the previously recorded signature characterizing data and the dynamically generated signature waveform may be off-line as hereinabove described, with the connection of the signature verifier 11' to the processor 105 being made for the purpose of establishing the then existing credit rating of the card holder.

Referring now to FIG. 7 there is shown another embodiment of the credit verifier 11''. In this embodiment data entry mechanism 113, for example, a 10-key keyboard, is arranged to permit a customer to enter his appropriate assigned signature characterizing number sequence. This may comprise a multidigit number similar in function to the authorized signature data 35 read from the credit card 33 illustrated in FIG. 3. In this embodiment, after the signature characterizing number sequence is entered into the signature verifier 11″, the prospective purchaser then writes his authorized signature on the tablet 15 using stylus 17. In the manner similar to that hereinabove described, a comparison would be made between the password-type signature characterizing information entered via the keyboard 113 and the dynamically generated signature waveform generated by stylus 17. The match or degree of correlation between the password-type information and the waveform dynamically generated during the writing of the purportedly authorized signature as hereinabove described determines whether credit is to be extended to the potential customer. Appropriate indicator lights 21 and 23 would be energized as hereinabove explained to inform the clerk or teller whether the signature signed by the prospective customer corresponds with that of the person to whom the password entered authorizes credit to be given. As in FIG. 6, the signature verifier 11″ may go online and the information entered via the keyboard 113 may additionally comprise account information thereby permitting an instantaneous credit check at the time a customer requests that credit be extended to him.

While in the foregoing various specific embodiments of the invention have been illustrated, it is to be understood that many modifications may be made by those skilled in the art without departing from the scope of the invention. For example, the previously recorded or password-type signature characterizing data may be recorded in either digital or analogue form. Similarly the correlation or comparison of the previously recorded signature characterizing information with the dynamically generated signature waveform may be on a digital or analogue basis. While in the foregoing two specific embodiments of correlation technique have been broadly recited, the particular structure of the correlation circuits may vary widely depending upon the degree of security desired for the particular ID application. For example, in a low security system, the previously recorded information and the dynamic regenerated waveform could be optically compared to determine whether the signature of the presenter of the credit card is that of the authorized user. Many modifications may be made by those skilled in the art without departing from the scope of the invention which is pointed out with particularity in the appended claims.

We claim:

1. A method for establishing the identity of an individual on the basis of a handwritten mark, for example the signature of the individual to be identified, said method comprising the steps of generating a dynamic signature characterizing electrical waveform, said dynamic waveform being a predetermined function of the varying pressure exerted by a stylus in contact with a marking surface when the individual to be identified writes his signature, generating an authorized signature characterizing waveform, said authorized signature characterizing waveform corresponding to a like predetermined function of the varying pressure exerted by a stylus on a marking surface in writing the signature to be authorized, and comparing said dynamic signature characterizing pressure waveform with said authorized signature characterizing waveform to determine the degree of match therebetween.

2. The method defined in claim 1 wherein said step of comparing comprises the step of electrically analyzing predetermined parameters of said dynamic signature characterizing waveform with like parameters of said authorized signature characterizing waveform.

3. The method defined in claim 2 wherein said step of electrically analyzing comprises the step of cross correlating said dynamic signature characterizing waveform with said authorized signature waveform to determine the maximum degree of correlation therebetween and additionally including the step of signalling a verified condition when said dynamic signature characterizing waveform and said authorized signature characterizing waveform correlate within predetermined limits.

4. A method for determining whether an individual is a member of a predetermined group on the basis of a handwritten mark, for example a signature, wherein an authorized signature or mark for each member of said predetermined group is characterized by individual identifying information that is derived as a predetermined function of an electrical signal generated as such individual writes his authorized mark upon being enrolled in said predetermined group, said method comprising the steps of generating a dynamic signature characterizing electrical waveform as the person to be verified as a member of said group writes his mark, and comparing said individual identifying information for at least one of said predetermined members of said group with like signature identifying information derived from said dynamic signature characterizing waveform to determine the degree of correlation therebetween.

5. The method defined in claim 4 wherein said step of comparing comprises the steps of analyzing said dynamic signature characterizing electrical waveform to derive individual identifying information as a predetermined parameter of at least one function of said electrical waveform, and matching similar portions of said individual identifying information and said individual identifying information derived from said dynamic signature characterizing waveform to determine the degree of likeness therebetween.

6. The method defined in claim 4 wherein the step of comparing comprises the steps of generating an authorized signature analogue electrical waveform from said authorized signature individual identifying information presented by the person to be identified, and correlating said analogue electrical waveform generated from said authorized signature identifying information with said dynamic signature characterizing waveform to determine whether said respective waveforms correlate within a predetermined degree.

7. Personal identification verifier apparatus for determining whether a particular individual is a member of a predetermined group of authorized persons, said apparatus comprising information entry means for receiving authorized signature characterizing information data, said authorized signature characterizing information data being issued to ones of said authorized persons when they are admitted as members of said group, identifying means for generating a dynamic electrical waveform as said individual to be identified writes his signature or mark, comparison means for comparing at least one function or parameter of said electrical waveform with said authorized signature characterizing data entered by said individual via said information entry means, and signalling means for signalling a verify condition whenever said derived information and said authorized signature characterizing information favorably correlate within predetermined limits.

8. The apparatus defined in claim 7 wherein said information entry apparatus comprises means for receiving a credit-type card and for reading authorized signature identifying information from cards inserted therein.

9. The apparatus defined in claim 7 wherein said identifying means comprises pressure responsive means for generating the signature characterizing electrical analogue waveform as said individual writes his mark, said analogue waveform being proportional to a predetermined function of the varying pressure exerted by said individual between a marking stylus used to make his mark and a marking surface on which said mark is made.

10. The apparatus defined in claim 7 wherein said comparison means includes converter means for generating an authorized signature analogue electrical waveform in response to said information data entered via said information entry means, and correlation means for electrically comparing said analogue waveforms to determine the degree of correlation between said dynamic and authorized signature waveforms.

11. The apparatus as defined in claim 7 wherein said identifying means includes an electrical transducer responsive to the varying pressures exerted by a person to be identified when writing the authorized signature or mark, and wherein said electrical transducer forms part of an electrical circuit and cooperates therewith to generate electrical signals indicative of such varying pressures.

12. The apparatus as defined in claim 11 wherein said electrical transducer is a strain gauge, and wherein the strain gauge is incorporated in the circuit as one part of a balanced bridge circuit.

13. Personal identification verifier apparatus comprising means for generating a dynamic electrical analogue waveform as an individual to be identified writes his signature or mark, means responsive to authorized signature information supplied by said individual for generating an authorized signature waveform and means for correlating said dynamic and authorized waveforms to determine the degree of likeness therebetween.

14. The identification verifier apparatus defined in claim 13 additionally including means for coupling said apparatus via a communication channel to an on line data processor and wherein said correlation means includes means for transmitting at least the dynamic waveform to said data processor whereby comparison of said dynamic waveform may be correlated with authorized signature data for those persons included within a predetermined population group.

15. Personal identification verifier apparatus comprising:

means for receiving a credit card or the like bearing an authorized signature characterizing identifying data and for reading such data, means responsive to forces exerted by an individual to be identified as he writes the authorized signature for generating an electrical waveform signal corresponding to such forces, means for electrically comparing at least one or more identifying features of said electrical waveform signal with the authorized signature characterizing data read from a credit card received by the apparatus, and means for indicating whether the electrical waveform signal compares favorably with the authorized signature characterizing data read from the credit card.

16. A personal identification verifier system comprising, in combination:

apparatus for generating a dynamic electrical analogue waveform signal concurrently as an individual to be identified writes his signature or mark, means responsive to authorized signature data furnished by said individual for generating an authorized signature waveform signal, means for coupling said apparatus by way of a communication channel to a remote data processor, and means for transmitting at least the dynamic waveform signal to said data processor whereby comparison of said dynamic waveform signal may be correlated with the authorized signature waveform signal to determine the degree of likeness therebetween.

17. A method for establishing the identity of an individual on the basis of a handwritten mark, for example, the signature of the individual to be identified, said method comprising the steps of:

reading a credit card or the like bearing prerecorded identifying features of an authorized signature, generating a signature characterizing electrical waveform signal as a function of the varying forces exerted by a stylus in contact with a marking surface when an individual presenting the credit card writes the authorized signature, and electrically comparing the electrical waveform signal with the identifying features of the authorized electrical waveform recorded on the credit card to determine the degree of match therebetween.

18. A method for establishing the identity of an individual on the basis of a handwritten mark, for example, the signature of the individual to be identified, said method comprising the steps of:

generating an authorized signature characterizing electrical waveform signal as a function of the varying forces exerted by a stylus in contact with a marking surface when an authorized individual writes his signature, recording identifying features of the authorized electrical waveform signal upon a credit card or the like, generating a second signature characterizing electrical waveform signal as a function of the varying forces exerted by a stylus in contact with a marking surface when an individual presenting the credit card writes the authorized signature, and electrically comparing the second generated electrical waveform signal with the identifying features of the authorized electrical waveform signal recorded on the credit card to determine the degree of match therebetween.